(12) United States Patent
Smolders

(10) Patent No.: US 6,253,338 B1
(45) Date of Patent: Jun. 26, 2001

(54) SYSTEM FOR TRACING HARDWARE COUNTERS UTILIZING PROGRAMMED PERFORMANCE MONITOR TO GENERATE TRACE INTERRUPT AFTER EACH BRANCH INSTRUCTION OR AT THE END OF EACH CODE BASIC BLOCK

(75) Inventor: Luc Rene Smolders, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/224,121

(22) Filed: Dec. 21, 1998

(51) Int. Cl.$^7$ ....................................... H02H 3/05
(52) U.S. Cl. .................. 714/45; 714/37; 714/38; 714/39; 714/47; 712/227
(58) Field of Search .................. 714/37, 35, 38, 714/47, 39, 48, 45; 717/9; 711/125, 134; 702/186

(56) References Cited

U.S. PATENT DOCUMENTS

| | | | |
|---|---|---|---|
| 4,598,364 | * 7/1986 | Gum et al. ........................ | 714/38 |
| 5,274,811 | * 12/1993 | Borg et al. ........................ | 395/704 |
| 5,446,876 | * 8/1995 | Levine et al. ........................ | 714/37 |
| 5,564,028 | 10/1996 | Swoboda et al. . | |
| 5,594,864 | 1/1997 | Trauben . | |
| 5,621,886 | 4/1997 | Alpert et al. . | |
| 5,630,102 | 5/1997 | Johnson et al. . | |
| 5,642,479 | 6/1997 | Flynn . | |
| 5,717,881 | 2/1998 | Beard et al. . | |
| 5,724,566 | 3/1998 | Swoboda et al. . | |
| 5,740,414 | 4/1998 | Tovey et al. . | |
| 5,835,702 | * 11/1998 | Levine et al. ........................ | 714/39 |
| 5,991,708 | * 11/1999 | Levine et al. ........................ | 702/186 |
| 5,996,092 | * 11/1999 | Augsburg et al. ........................ | 714/38 |
| 6,006,033 | * 12/1999 | Heisch ........................ | 717/9 |
| 6,067,644 | * 5/2000 | Levine et al. ........................ | 714/47 |

OTHER PUBLICATIONS

"Transition Records For Tracing Program Flows", IBM Technical Disclosure Bulletin, Jun. 1996.*

"Transition Records For Tracing program Flows On Amazon and POWERPC Machines", IBM Technical Disclosure Bulletin, Nov. 1997.*

* cited by examiner

Primary Examiner—Meng-Al T. An
Assistant Examiner—Nabil El-Hady
(74) Attorney, Agent, or Firm—Volel Emile; Bracewell & Patterson, L.L.P.

(57) ABSTRACT

A method and system within a data processing system or information handling system are disclosed for counting various events from a running program (hereafter called a process) by taking a trace by way of using an interruption. According to the present invention, a performance monitor feature within a data processing system is programmed to generate a trace interrupt after each branch instruction, or at the end of each basic block of code from a currently running program or process. By programming monitor mode control registers within the performance monitor feature, one or more counters are programmed to count various events happening on the data processing system thereby creating tracing information. If the current process is a process to be traced, the tracing information is stored in a trace buffer for post-processing analysis, the counters are reset to zero returning back to the process from the interrupt.

15 Claims, 3 Drawing Sheets

SYSTEM FOR TRACING HARDWARE COUNTERS UTILIZING PROGRAMMED PERFORMANCE MONITOR TO GENERATE TRACE INTERRUPT AFTER EACH BRANCH INSTRUCTION OR AT THE END OF EACH CODE BASIC BLOCK

BACKGROUND OF THE INVENTION

1. Technical Field

The present invention relates in general to a method and system for data processing and in particular to an improved method and system for counter level tracing. Still more particularly, the present invention relates to a method and system for tracing hardware counters by way of an interruption without introducing any overhead or modifying the code being counted.

2. Description of the Related Art

Most modern microprocessors, like members of the PowerPC family, provide hardware counters that can be programmed to count various events happening on the processor. To date, tools have been built around these facilities (usually and hereafter referenced as Performance Monitor) for application and operating system tuning. Such tools report counter values over complete runs of workloads to tune. In this mode, one resets the counters, programs the performance monitor to count the desired events, runs the workload to measure, and reads the counters after the workload has completed. This procedure is limited in that it only provides global information, i.e. from start to finish, without the possibility of figuring out which part of the workload is responsible for the counter increments.

Application Programming Interfaces (API) have also been built to collect counter information for portions of workloads. In this mode, one must add calls to API code just before and immediately after the execution of the portion of the workload to analyze. The former is to setup and start the counting and the latter is to stop the counting and retrieve the results. Those API calls can either be added directly to the source code if it is available or by way of instrumentation, i.e. dynamic insertion of code to divert normal execution path. This technique provides lower granularity results than the global counting of the previous approach, but at a big cost due to the overhead of the outside code necessary to control the counting. The overhead is what directly limits the obtainable granularity of the results.

Consequently, it would be desirable to provide an improved method and system that determines which part of a workload is responsible for counter increments of desired events without any overhead. In particular, it would be desirable to provide an improved method and system which utilizes a performance monitor facility and generates an exception after each branch instruction for gaining control at a basic block level for counting various events happening on a microprocessor.

SUMMARY OF THE INVENTION

It is therefore one object of the present invention to provide an improved method and system for data processing.

It is another object of the present invention to provide an improved method and system for counter level tracing.

It is yet another object of the present invention to provide an improved method and system for tracing hardware counters by way of an interruption without introducing any overhead or modifying the code.

The foregoing objects are achieved as is now described. A method and system within a data processing system or information handling system are disclosed for counting various events from a running program (hereafter called a process) by taking a trace by way of using an interruption. According to the present invention, a processor within a data processing system is programmed to generate a trace interrupt at least after each branch instruction, or at the end of each basic block of code from a currently running program or process. By programming monitor mode control registers within a performance monitor feature, one or more counters are programmed to count various events happening on the data processing system thereby creating tracing information. If the current process is a process to be traced, the tracing information is stored in a trace buffer for post-processing analysis, the counters are reset to zero returning back to the process from the interrupt.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
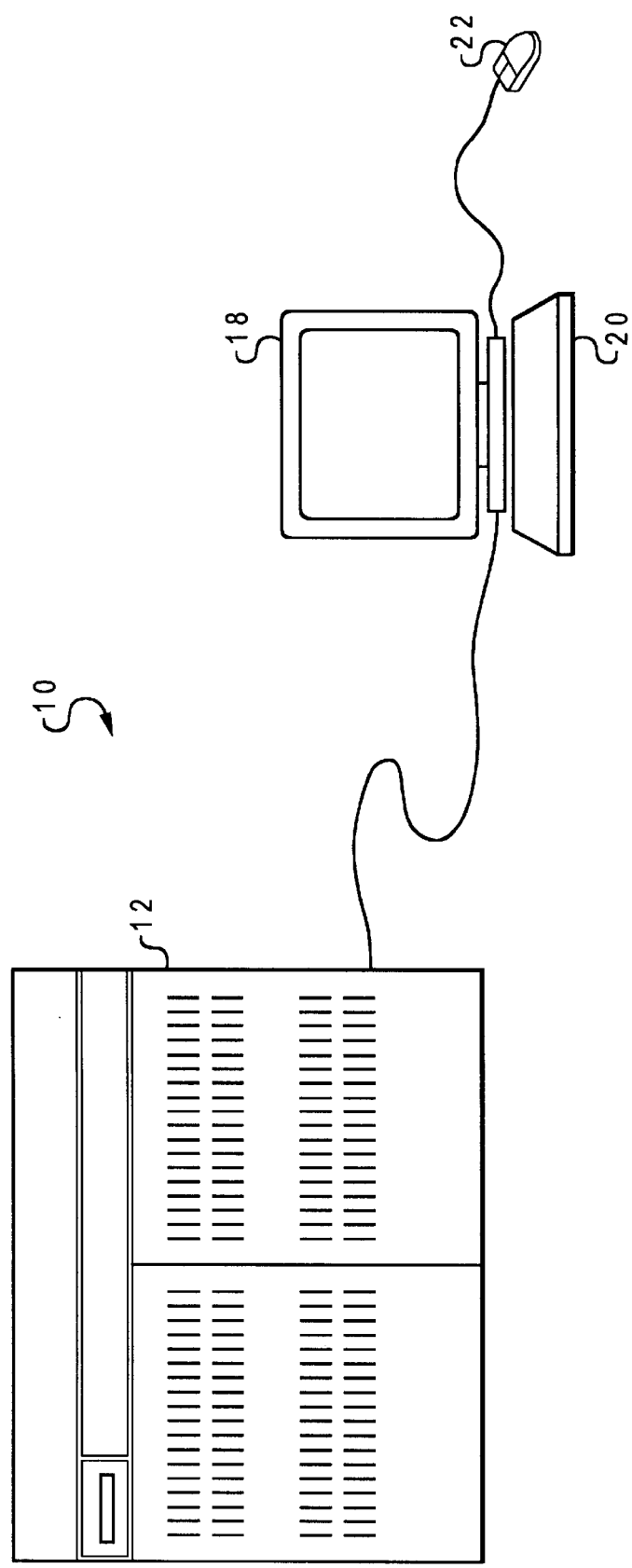
FIG. 1 is a block diagram of a data processing system which may be used to run a counter level tracing tool of the present invention.

With reference now to the figures and in particular with reference to FIG. 1, there is illustrated a preferred embodiment of a data processing system 10 that includes a processor which employs the method and system of the present invention. The processor comprises a single integrated circuit pipelined superscalar microprocessor. Accordingly, as discussed further below, the processor includes various execution units, registers, buffers, memories, and other functional units, which are all formed from integrated circuitry. The processor preferably comprises one of the PowerPC™ line of microprocessors available from IBM Microelectronics (e.g., the PowerPC™ 604), which operate according to reduced instruction set computing (RISC) techniques. Details concerning the architecture and operation of the PowerPC™ 604 processor may be found in the *PowerPC™ 604 RISC Microprocessor User's Manual*, which is incorporated herein by reference.

Figure 2:
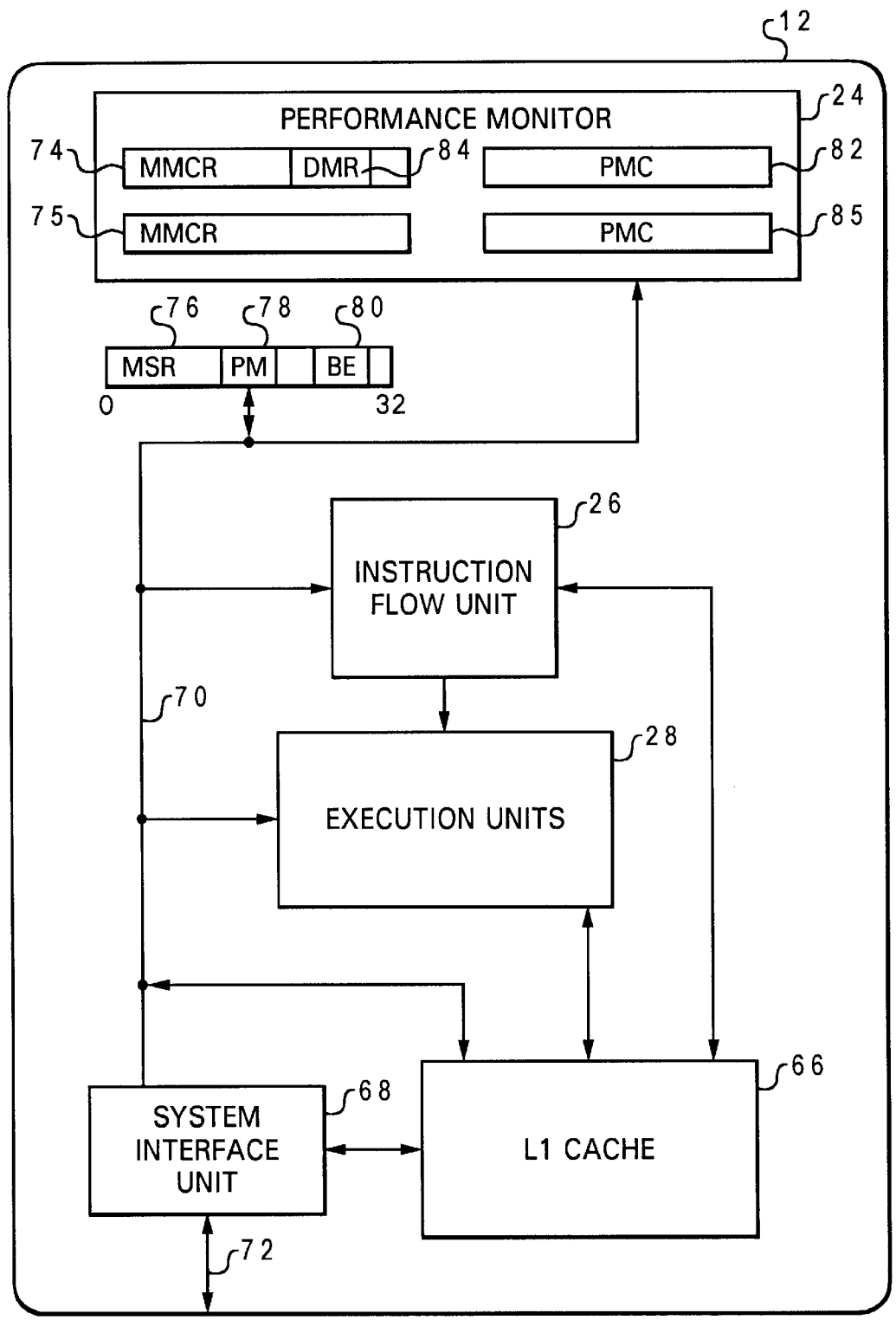
FIG. 2 is a more detailed block diagram of the data processing system of FIG. 1.

Turning once again to FIG. 1, the data processing system 10 comprises system processor unit 12 and display 18, keyboard 20, and mouse 22. As is well-known to those skilled in the art, a user inputs data to system processor unit 12 utilizing keyboard 20, mouse 22, or other suitable input device. Although only one processor unit is depicted in the exemplary embodiment, those skilled in the art will appreciate that additional processor units may be utilized in a multiprocessor data processing system in accordance with the present invention. With reference now to FIG. 2, there is depicted a more detailed block diagram of system processor unit 12. As illustrated, system processor unit 12 includes L1 cache 66, system interface unit 68, instruction flow unit 26, and execution units 28. System interface unit (SIU) 68 is connected to L1 cache 66, which comprises a small, relatively fast portion of memory that stores data and instructions retrieved from lower levels of memory via processor bus 72. Data and instructions stored within L1 cache 66 are retrieved as required by instruction flow unit 26, which then dispatches instructions to selected ones of execution units 28 for execution. The execution units 28 comprise one or more fixed-point execution units, load/store execution units, and floating-point execution units. As will be appreciated by those skilled in the art, the provision of multiple execution units 28 enables system processor unit 12 to execute multiple instructions during each processor cycle. In addition, system processor unit 12 includes a machine state register 76 and a performance monitor feature 24, which monitors activity within each functional unit of the system processor unit 12 via internal bus 70.

Referring once again to FIG. 2, the following procedure may be used to prepare the system processor unit 12 to execute the method and system of the present invention. By way of example but not of limitation, the aforementioned PowerPC™ 604 processor and its associated counters and registers are used to demonstrate this preparation procedure. As shown in FIG. 2, within the performance monitor 24 are monitor mode control registers (MMCR) 74 and 75, respectively, used for programming and one or more associated performance monitor hardware counters (PMC) 82 and 85 that used for counting operations. It should be understood that there might be more than two-monitor mode control registers (MMCR) 74 and 75 and their associated performance monitor hardware counters (PMC) 82 and 85 used in the present invention. First, the monitor mode control registers, 74 and 75 respectively, contain instructions for instructing their respective performance monitor counters, 82 and 85 respectively, to count a specified event. By way of example, but not of limitation, these types of events may include counting the number of cycles during a selected executing process or the number of load/store misses occurring within an L2 cache. Next, to halt or stop counting selected or specified events when an interrupt occurs, a performance monitor bit 78 is utilized within the machine state register 76. One of the monitor mode control registers 74 is programmed with a specified disabled bit 84 (DMR) set within the monitor mode control register 74 to halt or stop counting events for all of the hardware counters when the performance monitor bit 78 is not on. An advantage of the performance monitor bit 78 is that it is architecturally reset on interrupt on all PowerPC™ processors and when used in combination with the DMR bit 84 automatically stops all counters when the interrupt handler code starts executing. Also, the performance monitor bit 78 within the machine state register 76 is set for the program to be traced. Lastly, the instruction flow unit 26 is programmed to generate a trace interrupt after each branch by setting a specified branch trace enable bit 80 in the machine state register 76. When using a processor different than the POWERPC 604, used here by way of example only if such processor used does not have a branch tracing mode, i.e. the equivalent of the BE bit in the MSR and an automatic trace interruption after each branch, the processor would be programmed in single-step mode, i.e. to generate a trace interruption after each instruction. In such a case, the code handling the trace interruptions will have to check for branch instructions. When a branch is found, the flow of execution proceeds as described below in FIG. 3, if the instruction was not a branch, the flow of execution simply returns to the next instruction in sequence without any additional action. In summary, the method and system of the present invention may be applied to any system processor which is able to generate a trace interrupt after each branch of code, to count selected events during one or more processes, and a way to automatically halt or stop counting when an interrupt occurs.

Figure 3:
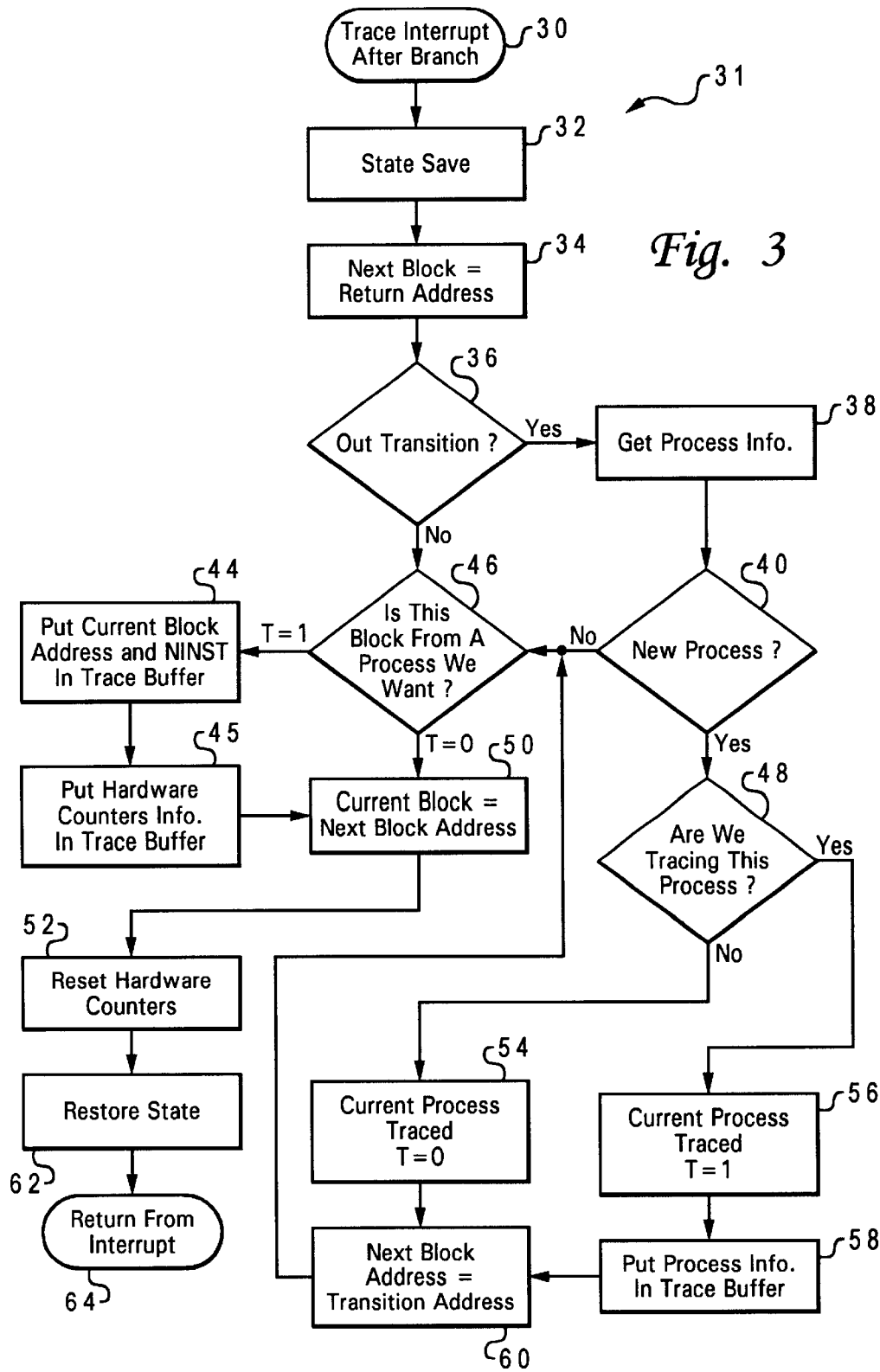
FIG. 3 is a flow diagram depicting the overall sequence of operations performed by the counter level tracing tool in accordance with the present invention.

The method and system employed in the counter level tracing tool 31 of the present invention will now be described with reference to the flowchart shown in FIG. 3. As described above, the instruction flow unit of the system processor unit 12 generates a trace interrupt after each branch instruction or at the end of each basic block of code as shown in step 30. By programming the monitor mode control register 74 to have the performance monitor counter 82 count instructions, the size of each basic block of code is determined. In the next step 32, after each branch instruction a trace interrupt is generated by step 30 and the performance monitor halts counting such that it does not count the interrupt handler code, the counter level tracing tool 31 then saves the current state (registers) information of the program being traced for later use. Since the counter level tracing tool 31 may use these registers, the state (registers) information is saved in memory during the execution of the method and system of the present information and then restored before returning from the interrupt, as will be more fully described below. Thereafter, the counter level tracing tool 31 saves the address of the beginning of the next basic block of code, which is the address where the interruption came from as shown in step 34.

It is known by those skilled in the art, that it is difficult to trace code when it is changing execution mode (from user mode to kernel mode and vice-versa). When a system call is executed or an exception occurs, i.e. the changing of the execution mode from user mode to kernel mode, the branch trace enable bit 80 doing the tracing and the performance monitor bit 78 doing the counting in the machine state register 76 are reset to zero. This will cause a discontinuity in the trace, i.e. to abruptly stop counting selected events and generate a trace interrupt while in the middle of a basic block. This point is referred to as an "in transition" requiring special processing within the operating system and the tracing tool which is beyond the scope of the present invention and therefore not detailed here. When returning to user mode from kernel mode, there is caused a discontinuity referred to as an "out transition" just before a user level thread is resumed. At these points in the trace, similar special processing is also needed. For those transitions the return address in user mode (i.e. the address the processor will jump to after it exits the kernel mode) is saved by the operating system and made available to the counter level tracing tool. This is referenced to as the transition address. One example of this is shown in "Transition Records for Tracing Program Flows," IBM™ Technical Disclosure Bulletin, Vol. 39, No. 06, Jun. 1996, pg.11.

In the preferred embodiment, in order to be able to get a complete trace, i.e., not limited to a single process, the counter level tracing tool keeps track of the current process information (by way of example but not of limitation a process identifier (PID), thread identifier (TID), and program name.) Referring once again to FIG. 3, the next step 36 is a decision step, which determines whether or not a new process has been dispatched. For the counter level tracing tool of the present invention, to see if a new process has been dispatched, the process information is checked for changes. It is safe to check for such changes only when the newly dispatched process is exiting the kernel, i.e., when in an "out transition," because the process information is only relevant when in user mode. Therefore, if it is not an "out-transition" then the process continues to decision step 46 to determine if it is a block of code from a desired process as will be more fully discussed below.

If the decision step 36 is an out transition, the process information is read as shown in step 38. The next step is a decision step 40 to determine if the current basic block of code belongs to a new process by checking the current process information for changes. If it is not then the counter level tracing tool 31 continues to decision step 46, as will be more fully described below.

If it is a new process then the method and system of the present invention continues to decision step 48, to determine, in accordance with prior user input, whether or not the process is to be traced. Step 56 shows that if the current process is to be traced then a variable T is set equal to one wherein the next step 58 puts the process information, (for example, the PID, TID and program name) into a trace buffer and continues to step 60. Step 54 shows that if the current process is not to be traced, T is set equal to zero and continues to step 60. Thereafter, step 60 sets the next block address equal to a transition address, the next address to be executed in the program and returns to decision step 46. Therefore, each time the process information changes, a special record of this information is put into a trace buffer. It should be noted that because of the "out transition" records, that marks the return from kernel to user mode, this operation is accomplished very efficiently by the counter level tracing tool.

If it is determined that the transition is not an out transition, the method and system of the present invention continues to decision step 46 to determine if the block of code is from a desired process previously specified by the user. If it is then the current basic block address (i.e. tracing information) and the value of the hardware counters, 74 and 75, respectively, are placed in the trace buffer, as shown in steps 44 and 45, and the counter level tracing tool 31 continues to step 50. If the block of code does not belong to a wanted process the counter level tracing tool 31 continues to step 50 wherein the current basic block address is set equal to the next basic block address.

The counter level tracing tool 31 then resets the hardware counters, 74 and 75 to zero and restores the previous state (registers) information, shown respectively by steps 52 and 62. At that point the counter level tracing tool 31 has completed its operation at 64 with a return from the interrupt.

The counter level tracing tool produces at least two files; one which contains the actual trace of basic blocks of code and counter information as they were executed and a few special records marking process changes (i.e. simply a copy of the trace buffer). The other file contains the list of executables traced and their basic block of code, and optionally all the instructions in each of these blocks. This file is built by the counter level tracing tool based on the contents of the trace buffer. Although only one processor unit is depicted in the exemplary embodiment, in a multiprocessor data processing system, one trace file is produced per processor and the basic block file is built based on the content of all trace buffers.

It therefore should be appreciated that the advantage of using the present invention versus prior art global counting tools and application programming interfaces is that the counter level tracing tool does not introduce any overhead and therefore allows fine analysis of the counter increments at the basic block level. When using prior art techniques, global counting tools, no overhead is introduced either, but the granularity of the results is from start to finish, making fine analysis impossible. When using prior art API, lower granularity of results can be produced but only up to a certain limit determined by the overhead introduced. The overhead is caused by the counting of the API code itself. With the present invention, the code of the counter level tracing tool is not counted therefore introducing no overhead at all.

It is also important to note that although the present invention has been described in the context of a fully functional counter level tracing too, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for tracing hardware counters in a data processing system, said method comprising the steps of:

executing a basic block of code from a current process;

programming monitor mode control registers to instruct one or more hardware counters to count specified events;

counting said specified events by said one or more hardware counters during said current process;

generating a trace interrupt during said counting of specified events;

responsive to generating said trace interrupt, determining if said current process is selected to be traced, wherein if said current process is selected to be traced, storing contents of said one or more hardware counters in a trace buffer;

determining for a kernel-mode-to-user-mode transition if said block of code belongs to a new process from current process information, wherein if said block of code belongs to a new process, further determining if said new process is selected to be traced such that a next block address may be determined following said trace interrupt;

wherein in response to determining that said new process is to be traced, storing the process information associated with said new process into a trace buffer and setting a next block address equal to a transition address; and wherein, in response to determining that said new process is not to be traced, setting a next block address equal to a transition address.

2. The method of claim 1, wherein said executing a basic block of code further comprises the step of:

setting a performance monitor bit within a machine state register for said process to be traced.

3. The method of claim 1, wherein said generating said trace interrupt further comprises the step of:
programming an instruction flow unit to generate said trace interrupt by setting a specified branch trace enable bit in a machine state register.

4. The method of claim 3, wherein said generating said trace interrupt further comprises the step of:
programming a monitor mode control register to set a specified disable bit within said monitor mode control register to stop counting said specified events when a performance monitor bit is not set such that interrupt handler instructions are not counted into current state information.

5. The method of claim 4, wherein said storing said contents of said one or more hardware counters further comprises the step of:
resetting said hardware counters to zero and restoring said state information.

6. The method of claim 1, wherein said storing contents of said one or more hardware counters further comprises the step of:
saving a beginning address of a next basic block of code of said current process being traced.

7. The method of claim 1, wherein said determining if said current process is to be traced further comprises the step of:
determining if said block of code belongs to a desired process, wherein if it is a desired process storing a current address and current count information in said trace buffer and setting a current block address equal to a next block address.

8. An information handling system, comprising:
processing means for executing a basic block of code from a current process;
processing means for programming monitor mode control registers to instruct one or more hardware counters to count specified events;
processing means for counting said specified events by said one or more hardware counters during said current process;
processing means for generating a trace interrupt during said counting of specified events;
processing means for determining if said current process is selected to be traced;
processing means responsive to said current process being selected to be traced for storing contents of said one or more hardware counters in a trace buffer;
processing means for determining for a kernel-mode-to-user-mode transition if said block of code belongs to a new process from current process information;
processing means responsive to determining that said block of code belongs to a new process for determining if said new process is selected to be traced such that a next block address may be determined following said trace interrupt;
processing means responsive to determining that said new process is to be traced for storing the process information associated with said new process into a trace buffer and setting a next block address equal to a transition address; and
processing means responsive to determining that said new process is not to be traced for setting a next block address equal to a transition address.

9. The information handling system of claim 8, wherein said processing means for executing a basic block of code further comprises:
processing means for setting a performance monitor bit within a machine state register for said program to be traced.

10. The information handling system of claim 9, wherein said processing means for generating said trace interrupt further comprises:
processing means for programming an instruction flow unit to generate said trace interrupt by setting a specified branch trace enable bit in said machine state register.

11. The information handling system of claim 10, wherein said processing means for halting instructions counting further comprises:
processing means for programming a monitor mode control register to set said specified disabled bit within said monitor mode control register to stop counting said specified events when said performance monitor bit is not on wherein an interrupt handler code is not counted and state (registers) information is stored.

12. The information handling system of claim 11, wherein said processing means for storing contents of said one or more hardware counters further comprises:
processing means for saving an address of a beginning of a next basic block of code of said current process being traced.

13. The information handling system of claim 12, wherein said processing means for determining if said current process to be traced further comprises:
processing means for determining if said block of code belongs to a desired process wherein if it is a desired process placing a current address and said count information in said trace buffer and setting a current block address equal to said next block address.

14. The information handling system of claim 13, wherein said processing means for storing said contents of said one or more hardware counters comprises:
processing means for resetting said hardware counters to zero and restoring said state (registers) information.

15. A computer program product residing on a computer usable medium for providing counter level tracing for an information handling system, said computer program product comprising:
instruction means for executing a basic block of code from a current process;
instruction means for programming monitor mode control registers to instruct one or more hardware counters to count specified events;
instruction means for counting said specified events by said one or more hardware counters during said current process;
instruction means for generating a trace interrupt during said counting of specified events; and
instruction means responsive to said trace interrupt for determining if said current process is selected to be traced;
instruction means responsive to determining that said current process is to be traced for storing contents of said one or more hardware counters in a trace buffer;
instruction means for determining for a kernel-mode-to-user-mode transition if said block of code belongs to a new process from current process information;
instruction means responsive to determining that said block of code belongs to a new process for determining if said new process is selected to be traced such that a next block address may be determined following said trace interrupt;

instruction means responsive to determining that said new process is to be traced for storing the process information associated with said new process into a trace buffer and setting a next block address equal to a transition address; and instruction means responsive to determining that said new process is not to be traced for setting a next block address equal to a transition address.

* * * * *